(12) United States Patent
Araki et al.

(10) Patent No.: US 9,696,943 B2
(45) Date of Patent: Jul. 4, 2017

(54) ACCESSING STORED DATA (71) Applicant: International Business Machines Corporation, Armonk, NY (US)

(72) Inventors: Hiroshi Araki, Yokohama (JP); Shah Mohammad Rezaul Islam, Tucson, AZ (US); Hiroyuki Miyoshi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 14/936,198

(22) Filed: Nov. 9, 2015

(65) Prior Publication Data

US 2017/0131949 A1     May 11, 2017

(51) Int. Cl.
*G06F 12/00* (2006.01)
*G06F 3/06* (2006.01)

(52) U.S. Cl.
CPC ............ *G06F 3/0659* (2013.01); *G06F 3/061* (2013.01); *G06F 3/0682* (2013.01)

(58) Field of Classification Search
CPC ....... G06F 3/0659; G06F 3/061; G06F 3/0682
See application file for complete search history.

(56) References Cited

U.S. PATENT DOCUMENTS

| 5,522,090 A * | 5/1996 | Tanaka ................. G06F 3/0601 710/74 |
| 2011/0078112 A1 | 3/2011 | Takata et al. |
| 2013/0238572 A1 | 9/2013 | Prahlad et al. |

OTHER PUBLICATIONS

IBM; "Improved time-aware recall mechanism using statistics in Hierarchical Storage Management (HSM)"; An IP.com Prior Art Database Technical Disclosure; http://ip.com/IPCOM/000188467; Oct. 9, 2009.

* cited by examiner

*Primary Examiner* — Shawn X Gu
(74) *Attorney, Agent, or Firm* — Kunzler Law Group (57) ABSTRACT

An apparatus, method, system, and program product are disclosed for accessing stored data. One method includes receiving a first request to access a first file having a first filename. The method may include storing the first request in a queue. The method may also include receiving a second request to access a second file having a second filename. The second file may be stored on a tape cartridge. The method may include accessing the second file in response to receiving the second request. The tape cartridge may be loaded into a tape reader to enable accessing the second file. The method may include, while the tape cartridge is loaded into the tape reader, executing the first request if the first filename matches a filename for a file stored on the tape cartridge.

20 Claims, 4 Drawing Sheets

ACCESSING STORED DATA

FIELD

The subject matter disclosed herein relates to stored data and more particularly relates to accessing stored data.

BACKGROUND

Data replication or data backups may be used to replicate data such that a backup of the data is maintained to aid in data recovery.

BRIEF SUMMARY

An apparatus for accessing stored data is disclosed. A method and computer program product also perform the functions of the apparatus. In one embodiment, an apparatus includes an application interface module that receives a first request to access a first file having a first filename. The apparatus, in a further embodiment, includes a queue module that stores the first request in a queue. In various embodiments, the apparatus includes a storage interface module that receives a second request to access a second file having a second filename. In one embodiment, the second file is stored on a tape cartridge. In certain embodiments, the apparatus includes a tape cartridge access module that accesses the second file in response to receiving the second request. In some embodiments, the tape cartridge is loaded into a tape reader to enable accessing the second file. In various embodiments, the apparatus includes a queue execution module that, while the tape cartridge is loaded into the tape reader, executes the first request if the first filename matches a filename for a file stored on the tape cartridge. In certain embodiments, at least a portion of the application interface module, the storage module, the storage interface module, the tape cartridge access module, and the queue execution module includes one or more of hardware and executable code. The executable code may be stored on one or more computer readable storage media.

A method for accessing stored data, in one embodiment, includes receiving a first request to access a first file having a first filename. In various embodiments, the method includes storing the first request in a queue. The method may also include receiving a second request to access a second file having a second filename. In one embodiment, the second file is stored on a tape cartridge. The method may include accessing the second file in response to receiving the second request. In some embodiments, the tape cartridge is loaded into a tape reader to enable accessing the second file. The method may include, while the tape cartridge is loaded into the tape reader, executing the first request if the first filename matches a filename for a file stored on the tape cartridge.

In one embodiment, a computer program product for accessing stored data includes a computer readable storage medium having program instructions embodied therewith. The program instructions, in some embodiments, are executable by a processor to cause the processor to receive a first request to access a first file having a first filename. The program instructions, in one embodiment, are executable by a processor to cause the processor to store the first request in a queue. In a further embodiment, the program instructions are executable by a processor to cause the processor to receive a second request to access a second file having a second filename. In one embodiment, the second file is stored on a tape cartridge. In certain embodiments, the program instructions are executable by a processor to cause the processor to access the second file in response to receiving the second request. In various embodiments, the tape cartridge is loaded into a tape reader to enable accessing the second file. In some embodiments, the program instructions are executable by a processor to cause the processor to, while the tape cartridge is loaded into the tape reader, execute the first request if the first filename matches a filename for a file stored on the tape cartridge.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

Figure 1:
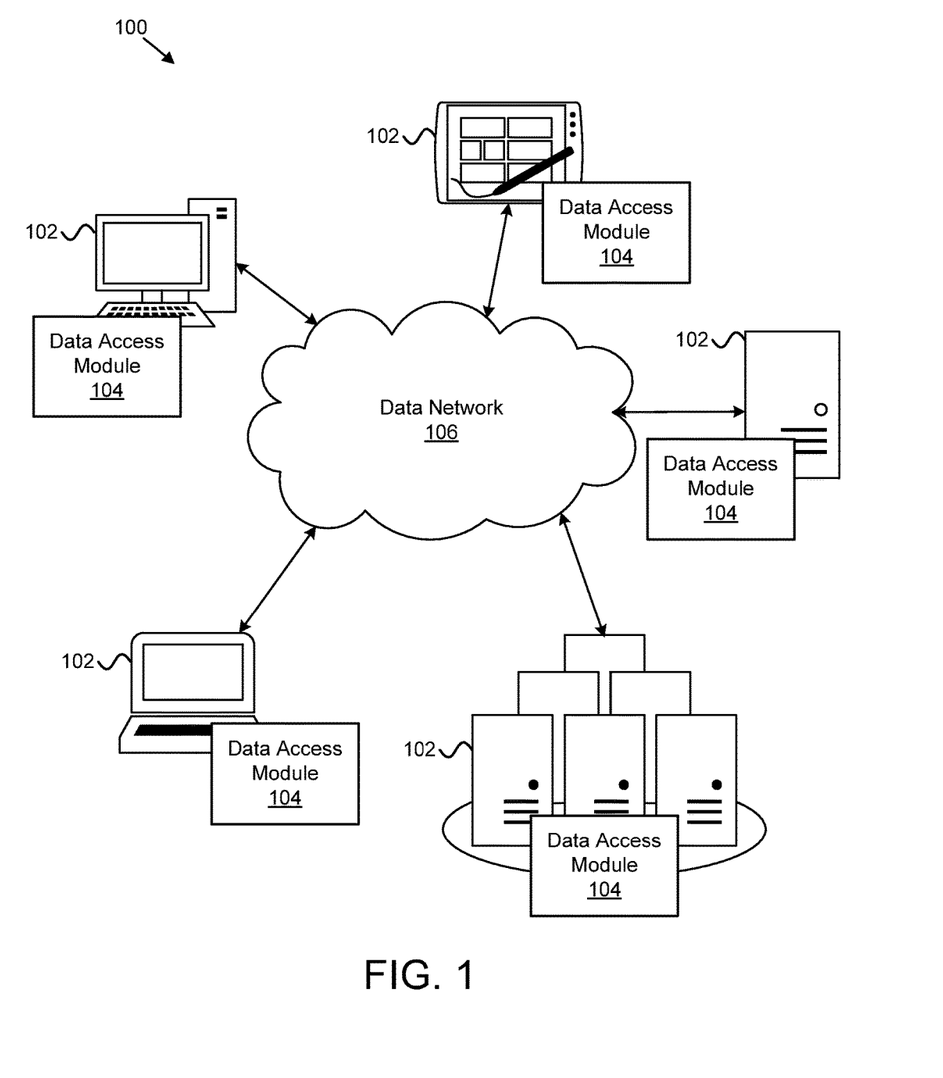
FIG. 1 is a schematic block diagram illustrating one embodiment of a system for accessing stored data in accordance with one embodiment of the present invention.

FIG. 1 depicts one embodiment of a system 100 for accessing stored data. In one embodiment, the system 100 includes information handling devices 102, data access modules 104, and data networks 106. Even though a particular number of information handling devices 102, data access modules 104, and data networks 106 are depicted in the system 100 of FIG. 1, one of skill in the art will recognize that any number or configuration of information handling devices 102, data access modules 104, and data networks 106 may be present in the system 100.

The information handling devices 102, in certain embodiments, include computing devices, such as desktop computers, laptop computers, tablet computers, smart phones, smart televisions, or the like. The information handling devices 102 may also include servers, such as web servers, application servers, file servers, media servers, email servers, cloud servers, backup servers, virtual servers, or the like. In some embodiments, the information handling devices 102 may be part of a data center used for data storage, data backup, data replication, disaster recovery, mirroring, and/or the like. The information handling devices 102 may be located in geographically remote locations, in the same geographic location (e.g., the same data center), or some combination of both.

The information handling devices 102 may be configured to store data, backup data, replicate data, or the like. For example, the information handling devices 102 may be configured to perform synchronous or asynchronous access to stored data. In another example, information handling devices 102 may be configured as failover devices for one or more associated information handling devices 102. Moreover, the information handling devices 102 may include one or more storage volumes, storage devices, redundant array of independent disks ("RAID") devices or configurations, or the like, such as hard-disk drives, solid-state drives, flash memory devices, random-access memory ("RAM"), serial advanced technology attachment ("SATA") devices, tape devices, tape readers, or the like. In some embodiments, the information handling devices 102 are in communication via one or more data networks 106, described below.

In one embodiment, the data access module 104 receives a first request to access a first file having a first filename. The data access module 104 stores the first request in a queue. The data access module 104 may receive a second request to access a second file having a second filename. The second file may be stored on a tape cartridge. The data access module 104 accesses the second file in response to receiving the second request. The tape cartridge may be loaded into a tape reader to enable accessing the second file. While the tape cartridge is loaded into the tape reader, the data access module 104 executes the first request if the first filename matches a filename for a file stored on the tape cartridge. In this manner, the data access module 104 may facilitate efficient use of tape cartridges loaded into a tape reader to provide access for applications to files stored on the tape cartridge. Ultimately, this may facilitate providing faster access for applications to files stored on a tape cartridge and/or reduced resource usage (e.g., time, processor, memory, data bandwidth, etc.).

As may be appreciated, the data access module 104 may be used in any suitable data replication system 100. In certain embodiments, as described below with reference to FIGS. 2 and 3, the data access module 104 includes multiple modules that perform the operations of the data access module 104.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
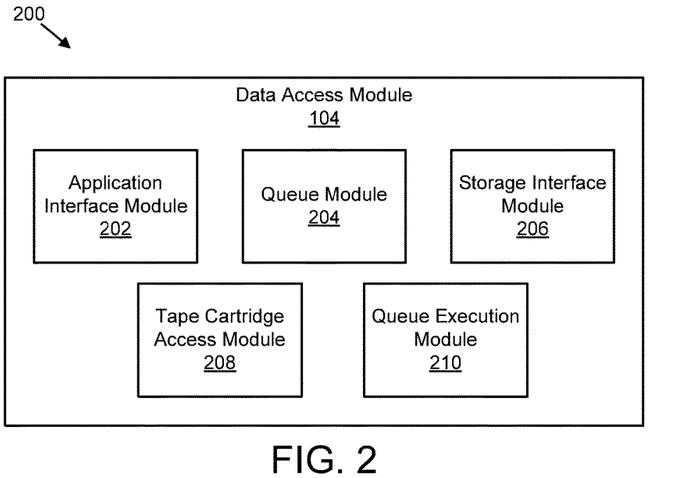
FIG. 2 is a schematic block diagram illustrating one embodiment of a module for accessing stored data in accordance with one embodiment of the present invention.

FIG. 2 is a schematic block diagram illustrating one embodiment of a module 200 for accessing stored data. In one embodiment, the module 200 includes an embodiment of a data access module 104. The data access module 104, in various embodiments, includes one or more of an application interface module 202, a queue module 204, a storage interface module 206, a tape cartridge access module 208, and a queue execution module 210, which are described in more detail below.

In one embodiment, the application interface module 202 receives a first request to access a first file having a first filename. The first request to access the first file may originate from an application by way of an application programming interface ("API"). In certain embodiments, the application interface module 202 includes the API. Moreover, the API may operate as an interface between the application and hierarchical storage management ("HSM"). As may be appreciated, the first file having the first filename may be stored on a backup device that is not available for accessing at the time of the first request. For example, the first file may be stored on a tape cartridge that is not loaded into a tape reader, such as a tape cartridge holding migrated data that exists only on the tape cartridge. Therefore, the first request may be an asynchronous recall callback such that the first request may be stored to be processed at a future time. In one embodiment, the API may allow upper applications to register and save callback requests to the HSM. For example, one example of a call to an API may be "hsmRegisterRecallCallback(arguments)." In some embodiments, the application interface module 202 may receive multiple requests from multiple applications for access to multiple files having different filenames. It should be noted that each request may correspond to one or more files.

As may be appreciated, the first request to access the first file may include one or more arguments corresponding to the request. The one or more arguments may be any suitable arguments. For example, the one or more arguments may include a caller identification ("ID") (e.g., an ID corresponding to the application making the request), a filename (e.g., one or more filenames to be read from tape cartridges), a callback function (e.g., a function pointer to be executed), one or more callback function arguments (e.g., arguments of the callback function including variables for filenames), a result file (e.g., name of a file to write out the result of the callback function), and control flags. In some embodiments, the callback function may be a remote copy command in which data is copied from the tape cartridge to a remote location, while in other embodiments, the callback function may be a notify command in which data is loaded to a disk from the tape cartridge then a calling application is notified.

In certain embodiments, the control flags may be used in writing out the results of the callback function. For example, in one embodiment, the control flags may include one or more of a migrate control, a pre-migrate control, a resident control, a callback function control, and a result file control. As may be appreciated, a resident file may mean a file that exists on a disk only, a migrated file may mean a file that exists on a tape cartridge only, and a pre-migrated file may mean a file that exits on both of a disk and a tape cartridge. Accordingly, in various embodiments, the migrate control, the pre-migrate control, and/or the resident control may indicate whether to load a file onto a disk. The indication about whether to load the file onto a disk may depend on whether the callback function is successful. In one embodiment, the callback function control may be used to invoke the callback function for every file, invoke the callback function for all files in a set of registered filenames that are from the same tape cartridge, and/or invoke the callback function for all files in the set of registered filenames. In certain embodiments, the result file control may be used to write out the filenames for which the callback function has been run and may depend on whether the callback function is successful.

It should be noted that an HSM may be a method to lower storage cost, but still maintain input/output ("I/O") performance. Within HSM, multiple tiers of storage media may be installed in a storage system. For example, a first tier may be a high-cost, fast storage media (e.g., such as solid state devices or disks), while a second tier may be a low-cost storage media (e.g., such as tape cartridges). The HSM automatically migrates data from the first tier to the second tier based on policies such as access frequency and file size. In certain embodiments, a stub file may be created on the first tier so that the migration is transparent to users. If a user tries to read data from a migrated file, the HSM will recall the migrated file from the second tier and present the migrated file to the user. As may be appreciated, the HSM may manage files in three different states: resident, migrated, and pre-migrated, as described previously.

A recall of a migrated file may be an expensive operation (e.g., use a considerable amount of resources, such as time, memory, and/or processor) because the HSM may have to locate a tape cartridge, load the tape cartridge into a tape reader (e.g., tape drive), locate the migrated file on the tape cartridge, and read the migrated file. In certain embodiments, with a recall, the migrated file is copied to disk and the status of the file is changed to pre-migrated or resident. As may be appreciated, if a large amount of data is recalled, multiple tape cartridges may be accessed, with each tape cartridge accessed a multiple number of times because the recalls may not operate efficiently (e.g., the recall may retrieve all files from a tape cartridge before moving to the next tape cartridge). Therefore, the application interface module 202 may be used to receive recall requests that may be stored so they are executed in groups to limit the number of times each tape cartridge is accessed. For example, a large number of requests to access files may be combined together so that when a tape cartridge is accessed all requested files that are on the tape cartridge may be accessed before the tape cartridge is removed from the tape reader. Furthermore, the application interface module 202 enables arguments to be included with a recall so that a recalled file does not need to change from migrated to pre-migrated or resident, but instead may stay as migrated. In other words, the arguments select whether the recalled file will stay migrated, become resident, or become pre-migrated.

The queue module 204, in one embodiment, stores the first request in a queue. In some embodiments, the queue module 204 stores multiple requests in the queue. In certain embodiments, the queue module 204 stores the requests in the queue at least until all of the one or more requests are executed. The queue module 204, in one embodiment, includes one or more computer readable storage medium for storing the one or more requests. In some embodiments, the queue module 204 may store the one or more requests as part of the HSM. The one or more requests may be stored with various arguments, in one or more callback tables. Each request may be stored in one or more callback tables as one or more callback entry.

The storage interface module 206, in one embodiment, receives a second request to access a second file having a second filename. The second file is a file that is stored on a tape cartridge (e.g., a migrated file). In one embodiment, the second request is a synchronous recall. Furthermore, in various embodiments, the second request may be received directly by the HSM. Accordingly, the second request to access the second file may be executed immediately upon being received. In certain embodiments, the storage interface module 206 may not be used and the first request may be triggered to execute by the application interface module 202 receiving a trigger to initiate execution of the first request (e.g., via a command such as hsmExecCallback (arguments)). The trigger may cause the HSM to look at the queue (e.g., callback table(s)), load a first tape cartridge for the first file in the queue, run the callbacks for the first file and any other files in the queue whose data are stored in that tape cartridge, load a second tape cartridge for the next file in the queue, run the callbacks for the file and any other files in the queue whose data are stored in that tape cartridge, and so forth until all of the queues are processed. As may be appreciated, the arguments for the trigger may be any suitable arguments, such as a caller ID and/or filenames which narrow down the queues to process.

In one embodiment, the tape cartridge access module 208 accesses the second file in response to receiving the second request. In certain embodiments, immediately upon receipt of the second request, the tape cartridge corresponding to the second file is loaded into a tape reader to enable accessing the second file. The second file may be read, copied, and/or moved in response to receiving the second request.

The queue execution module 210, in one embodiment, while the tape cartridge is loaded into the tape reader, executes the first request if the first filename matches a filename for a file stored on the tape cartridge. In certain embodiments, all of the filenames on the tape cartridge are compared to the filenames stored in the queue to determine which filenames stored in the queue correspond to files on the tape cartridge. A request corresponding to each match between the filenames stored on the tape cartridge and the filenames stored in the queue is executed. This facilitates the tape cartridge being loaded into the tape reader only once to retrieve all matching queued files.

In certain embodiments, at least a portion of the application interface module 202, the queue module 204, the storage interface module 206, the tape cartridge access module 208, and the queue execution module 210 include one or more of hardware and executable code. In such embodiments, the executable code may be stored on one or more computer readable storage media.

In certain embodiments, the data access module 104 may be used to facilitate replication. For example, a replication application may determine which files are to be copied to a remote site. For an initial copy, all files may be subject to being copied to the remote site. Moreover, the replication application may make a conventional call to an HSM to determine whether a file is migrated or resident on disk. If the file is resident on disk, the replication software may copy the file to the remote site. However, if the file is migrated to a tape cartridge, the replication software may keep a filename of the file in a list. When the filename list becomes a certain length (e.g., lower than a maximum number of files or characters for the filename field in a recall callback table supported by the HSM), the replication application may make a call to an API of the data access module 104, and using the data access module 104 may register the filenames and one or more callback functions for copying. The replication application may make multiple calls to the API of the data access module 104 and may register multiple sets of filenames, up to a certain number of times (e.g., lower than a maximum number of entries for the recall callback table supported by HSM). Moreover, the replication application may trigger the filenames stored in the callback tables by making a trigger call to the API (e.g., via a command such as hsmExecCallback(arguments)). The trigger may cause the HSM to look at the queue (e.g., callback table(s)), load a first tape cartridge for the first file in the queue, run the callbacks for the first file and any other files in the queue whose data are stored in that tape cartridge, load a second tape cartridge for the next file in the queue, run the callbacks for the file and any other files in the queue whose data are stored in that tape cartridge, and so forth until all of the queues are processed. As may be appreciated, the arguments for the trigger may be any suitable arguments, such as a caller ID and/or filenames which narrow down the queues to process.

Figure 3:
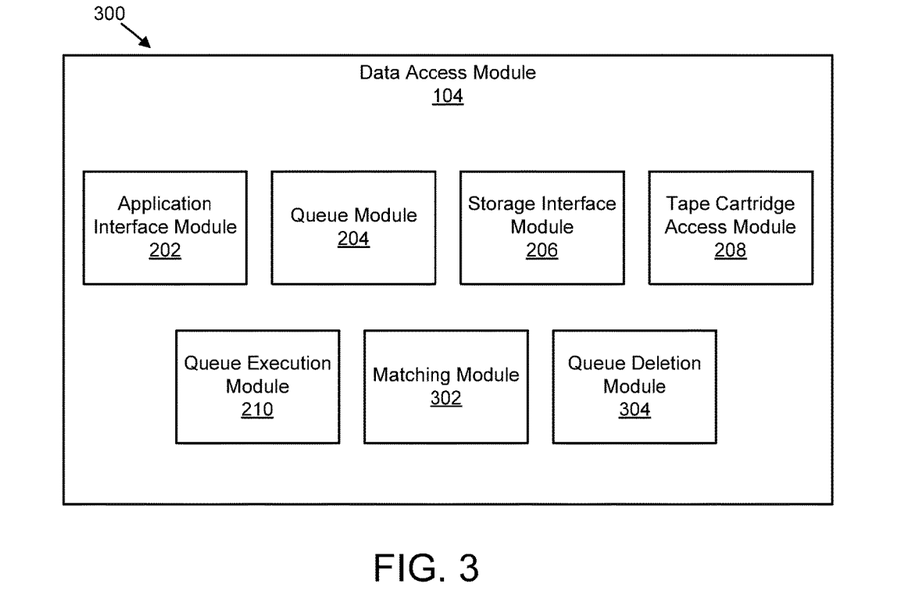
FIG. 3 is a schematic block diagram illustrating one embodiment of another module for accessing stored data in accordance with one embodiment of the present invention.

FIG. 3 is a schematic block diagram illustrating one embodiment of another module 300 for accessing stored data. In one embodiment, the module 300 includes an embodiment of a data access module 104. The data access module 104, in various embodiments, includes one or more of an application interface module 202, a queue module 204, a storage interface module 206, a tape cartridge access module 208, and a queue execution module 210, which may be substantially similar to the application interface module 202, the queue module 204, the storage interface module 206, the tape cartridge access module 208, and the queue execution module 210 described above. The data access module 104 may also include one or more of a matching module 302 and a queue deletion module 304, which are described in more detail below.

In one embodiment, the matching module 302 compares filenames stored in the queue to filenames stored on the tape cartridge to produce a list of matching filenames. For example, the matching module 302 may read the names of all filenames stored on the tape cartridge, compare the filenames read from the tape cartridge to each filename stored in the queue, then provide any matches to the queue execution module 210 for execution of the request corresponding to the filename.

The queue deletion module 304, in certain embodiments, deletes a request from the queue after the request has been executed. For example, after the queue execution module 210 has executed a request corresponding to a filename in the queue, the queue deletion module 304 may delete the request from the queue because the request has been completed.

Figure 4:
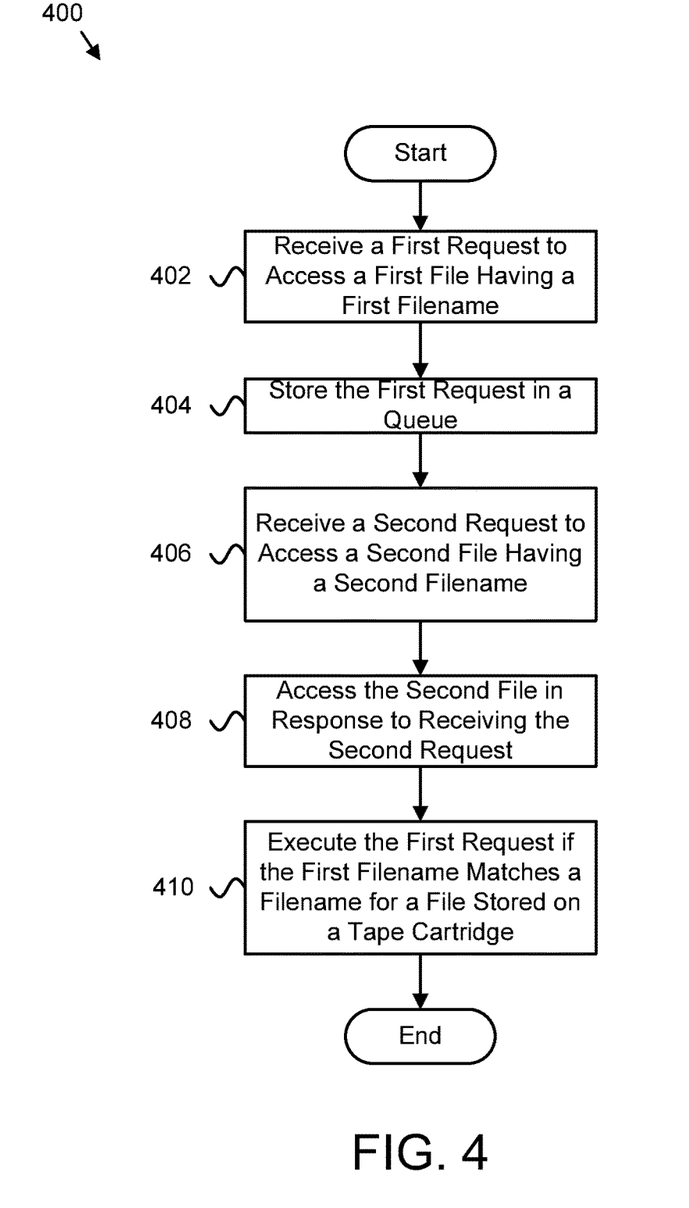
FIG. 4 is a schematic flow chart diagram illustrating one embodiment of a method for accessing stored data in accordance with one embodiment of the present invention.

FIG. 4 is a schematic flow chart diagram illustrating one embodiment of a method 400 for accessing stored data. In one embodiment, the method 400 begins and receives 402 a first request to access a first file having a first filename. In some embodiments, the application interface module 202 receives 402 the first request to access the first file having the first filename. In certain embodiments, the first request to access the first file having the first filename is received by an API. In such embodiments, the API may operate as an interface between an application and HSM. In certain embodiments, the first request may be an asynchronous recall callback. In various embodiments, multiple requests to access one or more files per each request may be received. Moreover, any request received may include one or more arguments. For example, the one or more arguments may include a caller ID, a filename, a callback function, one or more callback function arguments, a result file, and control flags, as described previously.

The method 400 may store 404 the first request in a queue so that the first request may be executed at a later time. In certain embodiments, multiple requests may be stored in the queue so that each request may be executed at a later time. In one embodiment, the queue module 204 may store 404 one or more requests in the queue so that the one or more requests may be executed at a later time.

The method 400 may receive 406 a second request to access a second file having a second filename. The second file may be stored on a tape cartridge. In certain embodiments, the second request is a synchronous recall (e.g., conventional recall). Accordingly, the second request may be executed immediately upon receipt. In one embodiment, the storage interface module 206 may receive 406 the second request to access the second file having the second filename. In various embodiments, the second request to access the second file having the second filename may be received directly by the HSM.

The method 400 may access 408 the second file in response to receiving the second request. Moreover, the tape cartridge may be loaded into a tape reader to enable accessing the second file. In certain embodiments, the tape cartridge access module 208 may access 408 the second file in response to receiving the second request. Furthermore, the second request may be executed.

The method 400 may execute 410 the first request if the first filename matches a filename for a file stored on the tape cartridge while the tape cartridge is loaded into the tape reader, and the method 400 may end. In various embodiments, the queue execution module 210 may execute 410 the first request if the first filename matches a filename for a file stored on the tape cartridge. As may be appreciated, the method 400 may execute 410 all requests stored in the queue that have filenames that match a filename for a file stored on the tape cartridge while the tape cartridge is loaded into the tape reader. In some embodiments, after a request is executed, the request may be deleted from the queue.

Figure 5:
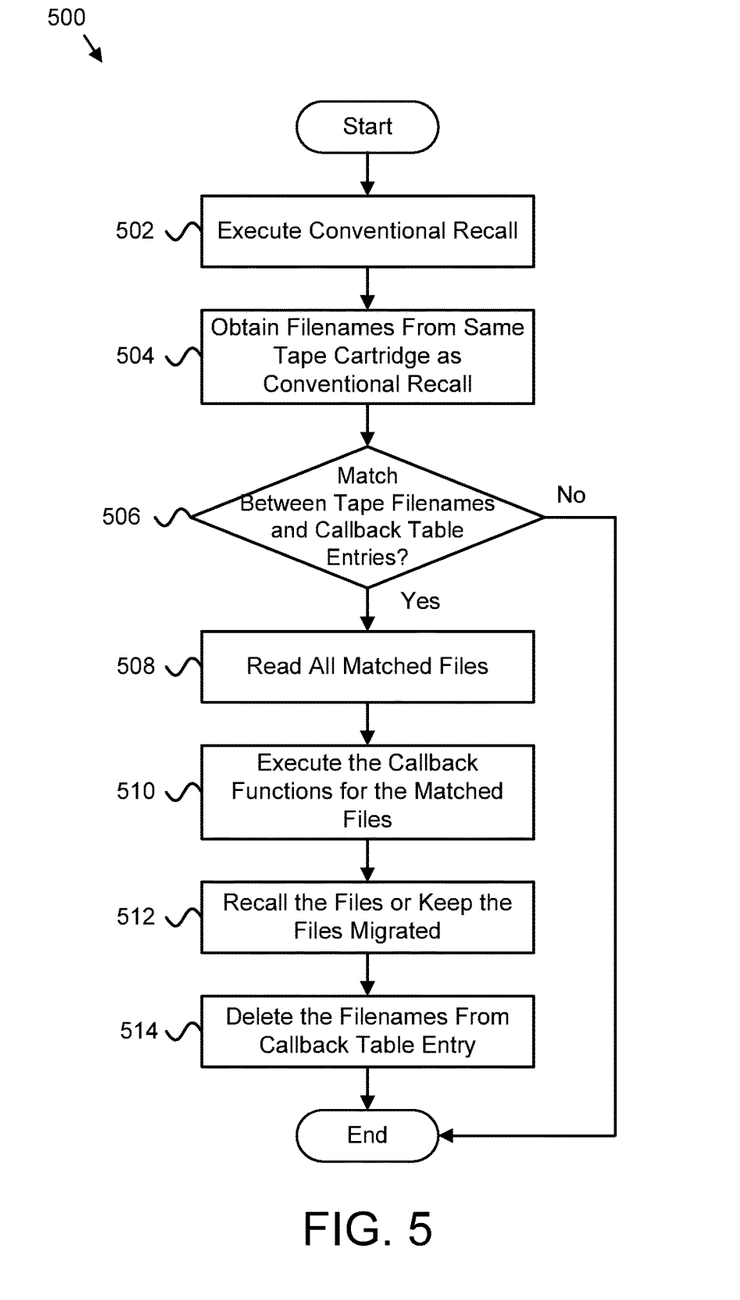
FIG. 5 is a schematic flow chart diagram illustrating one embodiment of another method for accessing stored data in accordance with one embodiment of the present invention.

FIG. 5 is a schematic flow chart diagram illustrating one embodiment of another method 500 for accessing stored data. In one embodiment, the method 500 begins and executes 502 a conventional recall. For example, a conventional recall may be a recall as described above. The recall may be initiated when a user directly attempts to access a migrated file. Accordingly, during execution 502 of the conventional recall, the HSM may determine a tape cartridge on which the migrated file is located, load the tape cartridge, find the migrated file, and move and/or copy the migrated file to disk for access by the user.

While the tape cartridge is loaded, the method 500 may obtain 504 filenames from the tape cartridge. Moreover, the method 500 may determine 506 whether there is a match between filenames on the tape cartridge and callback table entries. The callback table entries may include filenames that have been requested by an application and stored for execution as soon as the corresponding tape cartridge is loaded. As may be appreciated, the application requesting a file is not able to determine what tape cartridge includes the requested file, so the request is queued and each time a tape cartridge is loaded, the tape cartridge is checked to see if there is a match between filenames on the tape cartridge and filenames in the queue. The application may be any suitable application requesting the file, such as anti-virus software, disk replication software, network data management software, transportable system management software, and so forth. Such applications may not need immediate access to a requested file, so such applications may register or store requests to be performed at a later time.

If it is determined that there are no matches between filenames on the tape cartridge and callback table entries, the method 500 may end. However, if it is determined that there is at least one match between filenames on the tape cartridge and callback table entries, the method 500 may, in some embodiments, read 508 all matched files from the tape cartridge. In various embodiments, the method 500 may execute 510 the callback functions stored in the callback table entries that correspond to the matched files. In certain embodiments, the method 500 may recall 512 the matched files or keep the matched files as migrated. In some embodiments, the method 500 may delete 514 entries corresponding to the matched files from the callback table entries, and the method 500 may end. It should be noted that if all entries from a particular callback table have been deleted, the entire callback table may be deleted.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an application interface module that receives a first request to access a first file having a first filename;
a queue module that stores the first request in a queue;
a storage interface module that receives a second request to access a second file having a second filename, wherein the second file is stored on a tape cartridge;
a tape cartridge access module that accesses the second file in response to receiving the second request, wherein the tape cartridge is loaded into a tape reader to enable accessing the second file; and
a queue execution module that, while the tape cartridge is loaded into the tape reader, executes the first request if the first filename matches a filename for a file stored on the tape cartridge;
wherein at least a portion of the application interface module, the storage module, the storage interface module, the tape cartridge access module, and the queue execution module comprises one or more of hardware and executable code, the executable code being stored on one or more computer readable storage media.

2. The apparatus of claim 1, comprising a matching module that compares filenames stored in the queue to filenames stored on the tape cartridge to produce a list of matching filenames.

3. The apparatus of claim 1, wherein the first request comprises an asynchronous recall callback.

4. The apparatus of claim 1, wherein the second request comprises a synchronous recall.

5. The apparatus of claim 1, comprising a queue deletion module that deletes a request from the queue after the request has been executed.

6. A method for accessing stored data, comprising:
receiving a first request to access a first file having a first filename;
storing the first request in a queue;
receiving a second request to access a second file having a second filename, wherein the second file is stored on a tape cartridge;
accessing the second file in response to receiving the second request, wherein the tape cartridge is loaded into a tape reader to enable accessing the second file; and
while the tape cartridge is loaded into the tape reader, executing the first request if the first filename matches a filename for a file stored on the tape cartridge.

7. The method of claim 6, wherein the first request to access the first file having the first filename is received by an application programming interface ("API").

8. The method of claim 7, wherein the API comprises an interface between an application and hierarchical storage management ("HSM").

9. The method of claim 6, wherein the first request comprises an asynchronous recall callback.

10. The method of claim 6, wherein the second request comprises a synchronous recall.

11. The method of claim 6, wherein the first request comprises one or more arguments.

12. The method of claim 11, wherein the one or more arguments comprise one or more of a caller identification, a filename, a callback function, one or more callback function arguments, a result file, and control flags.

13. The method of claim 6, comprising storing a plurality of requests in the queue.

14. The method of claim 13, comprising, while the tape cartridge is loaded into the tape reader, executing each request of the plurality of requests in the queue in which a filename of a respective request matches a filename for a file stored on the tape cartridge.

15. The method of claim 14, comprising deleting each request of the plurality of requests in the queue after being executed.

16. The method of claim 6, wherein the second request to access the second file having the second filename is received directly by hierarchical storage management ("HSM").

17. A computer program product for accessing stored data, the computer program product comprising a computer readable storage medium having program instructions embodied therewith, the program instructions executable by a processor to cause the processor to:

receive a first request to access a first file having a first filename;

store the first request in a queue;

receive a second request to access a second file having a second filename, wherein the second file is stored on a tape cartridge;

access the second file in response to receiving the second request, wherein the tape cartridge is loaded into a tape reader to enable accessing the second file; and     while the tape cartridge is loaded into the tape reader, execute the first request if the first filename matches a filename for a file stored on the tape cartridge.

18. The computer program product of claim 17, wherein the first request to access the first file having the first filename is received by an application programming interface ("API").

19. The computer program product of claim 17, wherein the first request comprises an asynchronous recall callback.

20. The computer program product of claim 17, wherein the second request comprises a synchronous recall.

\* \* \* \* \*